United States Patent
Drelon et al.

(10) Patent No.: US 8,303,246 B2
(45) Date of Patent: Nov. 6, 2012

(54) CONNECTING RADIAL ARMS TO A CIRCULAR FERRULE BY IMBRICATING ATTACHED PARTS

(75) Inventors: Godefroy Francis Frederic Drelon, Saint-Etienne (FR); Sebastien Jean Laurent Prestel, Arpajon (FR); Jean-Luc Soupizon, Vaux le Penil (FR)

(73) Assignee: Snecma, Paris (FR)

( * ) Notice: Subject to any disclaimer, the term of this patent is extended or adjusted under 35 U.S.C. 154(b) by 1027 days.

(21) Appl. No.: 12/250,768

(22) Filed: Oct. 14, 2008

(65) Prior Publication Data

US 2011/0038667 A1 Feb. 17, 2011

(30) Foreign Application Priority Data

Nov. 9, 2007 (FR) ..................................... 07 58938

(51) Int. Cl.
*F01D 25/24* (2006.01)
(52) U.S. Cl. ..................................... 415/142; 415/209.4
(58) Field of Classification Search ............... 415/209.4, 415/210.1, 209.3, 142; 29/889.21
See application file for complete search history.

(56) References Cited

U.S. PATENT DOCUMENTS

| 2,693,904 | A | | 11/1954 | Boyd | |
|---|---|---|---|---|---|
| 2,834,537 | A | | 5/1958 | Neary | |
| 5,272,869 | A | * | 12/1993 | Dawson et al. | 415/142 |
| 7,648,336 | B2 | * | 1/2010 | Cairo | 415/210.1 |
| 7,874,791 | B2 | * | 1/2011 | Ferber et al. | 415/210.1 |

FOREIGN PATENT DOCUMENTS

| EP | 0 171 329 A1 | 2/1986 |
|---|---|---|
| EP | 0 550 126 A1 | 7/1993 |
| FR | 2 106 561 | 5/1972 |
| GB | 2 115 487 A | 9/1983 |
| GB | 2 262 573 A | 6/1993 |

OTHER PUBLICATIONS

U.S. Appl. No. 12/259,630, filed Oct. 28, 2008, Drelon, et al.

* cited by examiner

*Primary Examiner* — Richard Edgar
(74) *Attorney, Agent, or Firm* — Oblon, Spivak, McClelland, Maier & Neustadt, L.L.P.

(57) ABSTRACT

Assembly of the connection of an arm to a ferrule is done by imbricating a side wing protruding from the end of the arm and keys bolted to the ferrule. The assembly may be supplemented with positioning pins.

6 Claims, 3 Drawing Sheets

CONNECTING RADIAL ARMS TO A CIRCULAR FERRULE BY IMBRICATING ATTACHED PARTS

Figure 1:
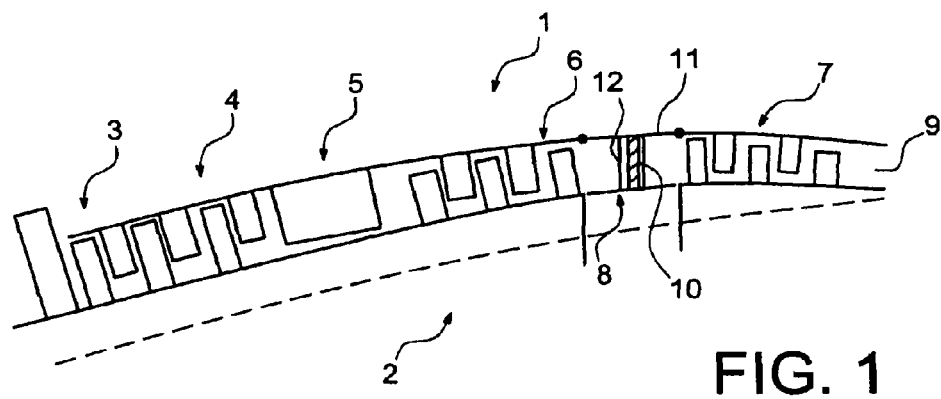

This invention relates to the connection of radial arms to a circular ferrule, particularly in aeronautical turbo-machines, by imbricating attached parts.

Some arrangements of such turbo-machines comprise an outer ferrule concentric to a ferrule of an inner hub and joining thereto by radial arms and binding an annular chamber or a portion of a gas stream, which is also annular, but opened to the axial ends thereof. An example appears in FIG. 1, which partially and schematically shows a turbo-machine conventionally comprising, between a stator 1 and a rotor 2, consecutive low pressure 3 and high pressure 4 compressors, a combustion chamber 5 and high pressure 6 and low pressure 7 turbines; the rotor 2 can be partitioned in two separate portions between the turbines 6 and 7 and an inner hub 8 extends between these two portions to maintain a smooth shape for a gas stream 9 in the turbo-machine. The inner hub 8 is supported by substantially radial arms 10 joining the (inner circular) ferrule thereof to a concentric outer ferrule 11 belonging to the stator 1 and which also bounds the gas stream 9, on the opposite outer side. The arms 10 have a generally rectangular simple section shape. They are subjected to high temperatures reached by combustion gases, while influencing on the flow thereof. The fairings 12 separated from the arms should be surrounded with a sufficient clearance to be somewhat protected from the heat and to provide a good aerodynamic bypassing profile to the gases. Since they also are structural arms of the machine, they undergo strong loads which require a sufficient strength of the arms and connections thereof.

Figure 4:
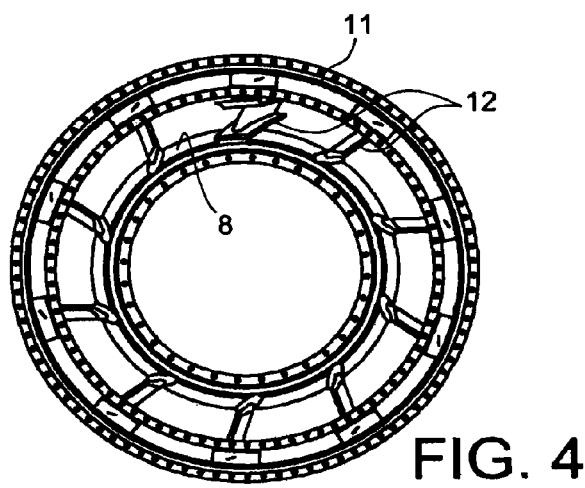

FIG. 4 illustrates the assembling of the outer ferrule 11, the arms 12 and the inner hub 8 of the turbine in an isolated state; for the sake of clarity, the assembling flanges (non referenced) to the stator 1 and the rotor 2 are shown.

It is difficult to assemble the arms 10 to the outer ferrule 11, whether the arms 10 are integral with the inner hub 8 or previously assembled thereto, since the clearance between the fairings 12, slipped around the arms 10, and the outer ferrule 11 is only small.

Carrying out the docking movement of the arms 10 to the assembling locations of the outer ferrule 11 is thus difficult, as well as inserting the tools required for the assembly through the fairing 12 set. The connection between the arms 10 and the outer ferrule 11 should be designed to comply with these stresses, but also to withstand strong loads experienced by operating arms and the high heat they undergo in spite of the fairings 12.

Figure 2:
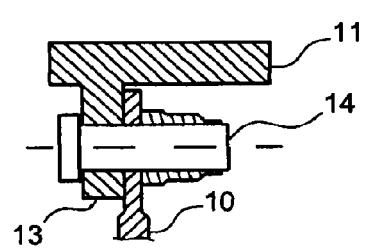

In a conventional assembly, illustrated in FIG. 2, an end of each arm 10 is drilled, a drilled lug 13 is provided on the outer ferrule 11, the arm 10 is positioned against the lug 13 so as to align the drilling thereof with the lug drilling, and a bolt 14 is driven through the drilling alignment and serves a support axis; but the loads undergone by the arm 10 apply stronger loads to the assembly parts, because of the assembly overhang, particularly bending load applied to the bolt, which is not desirable and requires the connection parts to be well oversized in order to withstand higher bending stresses than in the case of a symmetric configuration with two lugs. That is a reason why, in another design, illustrated in FIG. 3, the outer ferrule 11 is provided with two parallel lugs 15 and 16, with an end of the arm 10 positioned therebetween and a bolt 17 mounted through the drillings of the arm 10 and both lugs 15 and 16. The bending loads are thus reduced and the connection can be made lighter, however there is a dilemma: if the lugs 15 and 16 are spaced apart (which could be the consequence of an assembly requiring the arm 10 to move in a direction which is not parallel to the faces of the lugs 15 and 16), the assembly is simple, but the bolt 17 undergoes high shearing and bending forces (even if the bending is smoother thanks to the configuration symmetry) and the assembly has clearance; and bringing the lugs 15 and 16 closed to each other in the assembling step, by tightening the bolt 17, is not advantageous because the internal stresses become excessive and the bolt 17 is more easily seized up; if on the contrary the lugs 15 and 16 are constructed close to each other, the clearance with the end of the arm 10 becomes small or even disappears and the bending of the bolt 17 is eliminated, but inserting the arms 10 between the lugs 15 and 16 becomes difficult, even impossible if the arms 10 are directed with a slop in the angular direction of the machine, which is very frequent because of the gas flow rectification which must be carried out by the arms, because the assembly should then be assembled according to a helical movement, preventing the necessary loads to be applied at the insertion.

Other designs of the connection between the arms and the outer ferrule use intermediate parts, assembled both to the ferrule and the arms. An example is in document U.S. Pat. No. 5,272,869. Such designs often have such drawbacks as excessive sizes complicated the assembling step and they generally are bolted to the arms, and may prevent the arms from being taken down if the bolts become seized up.

This last drawback remains in other connections, in which the arms are directly united to the ferrule by bolts passing therethrough then positioned parallel to the arms direction. An example is in document U.S. Pat. No. 6,439,841. The screws can be engaged into crimped threaded inserts in the arm drillings, or engaged with a clearance into the smooth drillings of the arm which open to openings in which nuts and bolts can be inserted and screwed.

Lastly, in some arrangements, the arms are provided with wings or side skirts retained into blocking parts bolted to the ferrule, the wings being retained between the ferrule and other wings, which protrude from the blocking parts. Such a design is applied, inter alia, in documents GB-A-2262 573 and EP-A-0 550 126. It avoids almost all the drawbacks of previous designs, but has a drawback, thus not ensuring the position of the arms at the ferrule surface, since they can be inaccurately assembled or move in operation because of the loads they undergo, since they generally are structural arms assembled between two concentric ferrules. The above mentioned documents rather relate to pipes or hollow and flexible sleeves, without a structural resistance and which undergo weak loads.

Generally speaking, the invention relates to an arrangement comprising a circular ferrule, substantially radial arms joining the ferrule to another concentric ferrule, and connections of the arms to the ferrule, the connections comprise wings protruding from two opposite sides of the arm, keys comprising protruding wings, drillings of the ferrule and drillings of the keys, and bolts passing through alignments, each comprising one of the drillings of the ferrule and one of the drillings of the keys, and retaining the keys against the ferrule, the wings of the arm being respectively retained between the wings of the keys and the ferrule.

The advantages obtained by bolted connections comprising the key and wing imbrications according to the preceding definition may be explained as follows: assembling the connection is easy, even with a reduced access because of the fairing; the connection parts are simple, with small volume and weight; additional loads due to overhangs or assembling deformation are avoided; the bolts are separated from the arm, contacting parts which are less warm, and thus less subjected to heating and seizing up.

The arrangement is characterized in that it comprises alignments of other drillings of the ferrule and drillings of the arm, these alignments being occupied by centring pins. Combining such bolted connections and arrangements with centring pins allows the arms to be securely maintained to a permanent side position on the ferrule surface, also allowing the loads applied to the arms to be decomposed because axial loads are absorbed by the screws and tangential loads are absorbed by the pins.

According to the invention, the ferrule connected to the arms as indicated can be the outer ferrule 11, as usual, but also the circular ferrule of the inner hub 8: the arrangement would be the same, except some dimension modifications.

Another aspect of the invention is a turbo-machine comprising the connecting arrangement as explained above.

Figure 3:
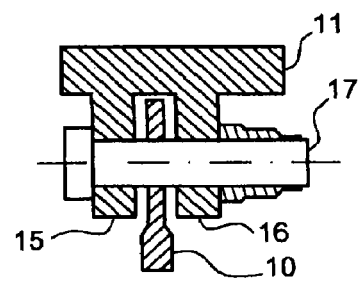
Figure 5:
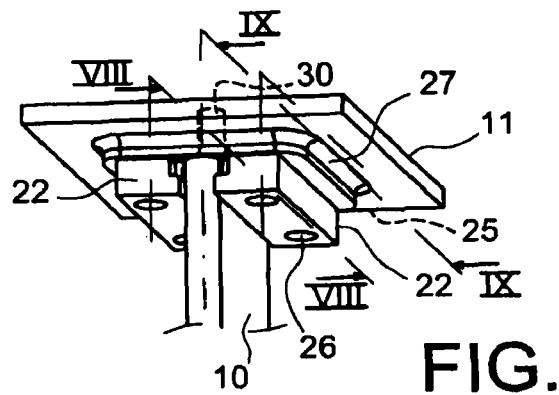
Figure 6:
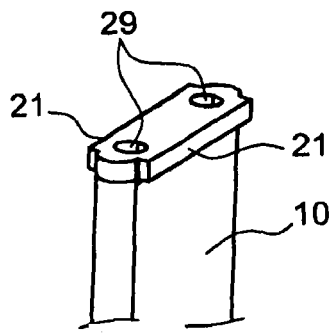
Figure 7:
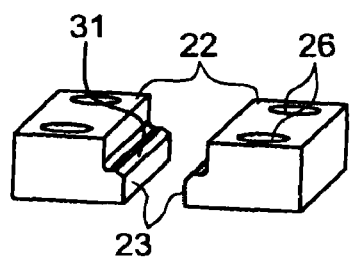
Figure 8:
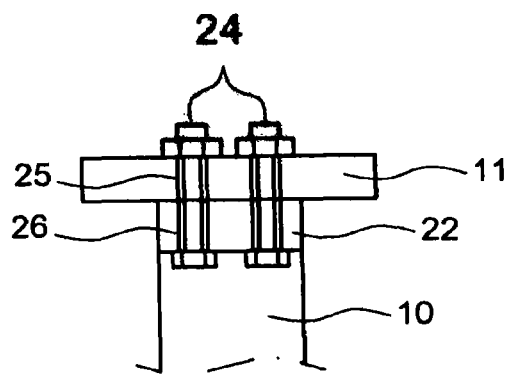
Figure 9:
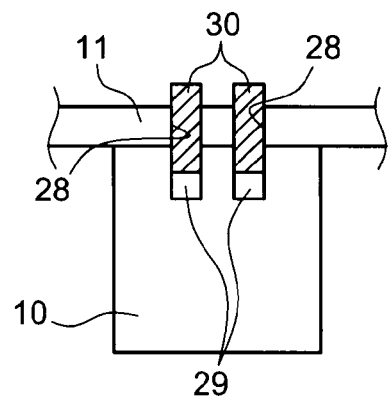
Figure 10:
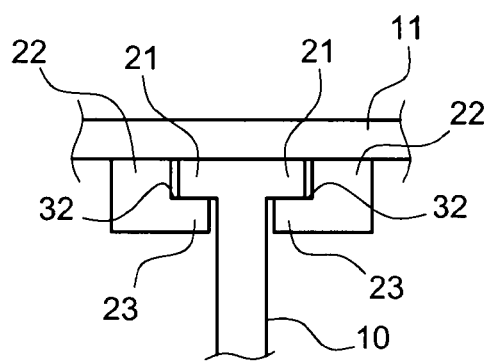
Figure 11:
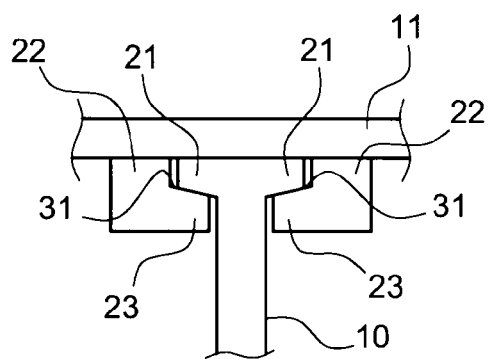

The invention will now be described in detail and under the aspects of certain embodiments referring to the following figures:

FIG. 1, already described, shows a turbo-machine provided with the invention;

FIGS. 2 and 3 already described show two embodiments or assemblies according to the prior art;

FIG. 4 already described shows another view of the ferrule and arm assembly;

and FIGS. 5, 6, 7, 8, 9, 10 et 11 show more precisely the connection between the ferrules and the arm, FIG. 5 being a general view, FIGS. 6 and 7 being views of certain isolated elements, FIGS. 8 and 9 being views along the lines VIII-VIII et IX-IX of FIG. 5, and FIGS. 10 and 11 being two alternative constructions of the wings.

The end of the arm 10 adjacent to the outer ferrule 11 carries two side wings 21 protruding from the long sides thereof (FIG. 6). The assembly also essentially comprises two attached parts called keys 22 which are similar and symmetrically disposed, each being provided with a protruding wing 23 (FIG. 7). The wings 23 of the keys 22 are located under the wings 21 of the arm 10, and the imbrication thus achieved maintains the end of the arm 10 against the outer ferrule 11 (FIG. 5). The assembly is completed with bolts 24 passing through the alignments of drillings 25 through the outer ferrule 11, and 26 through the keys 22. There are four drilling alignments and four bolts 24, two for each of the keys 22.

The outer ferrule 11 is provided with a boss 27 (FIG. 5) at each of the connections of arms 10, the surface thereof being flat or cylindrical, the cylinder having an axis coincident with the axis of the turbo-machine. The bosses 27 are interesting because they locally simplify the shape of the outer ferrule 11, which is generally a cone shape. The combination of the arms 10 and the inner hub 12 may thus be inserted much more easily to the assembly position.

Other alignments of drillings 28 and 29, which herein respectively pass through the outer ferrule 11 and the end of the arm 10 (FIG. 9) exist. They receive centring pins 30 of the arm 10 and thus ensure it is maintained in a fixed place. There may be two such alignments of drillings.

Supporting the wings 21 and 23 of the arm 10 and the keys 22 may be carried out in several ways, either by faces all parallel to one another and to the outer ferrule 11 (32 in FIG. 10), or by bevelled faces having a slanted direction (31 in FIGS. 7 and 11), angled from one another and tapered from the arm 10 for the faces 31 on the wings 21 of the disk 10, from the keys 22 for the faces 31 on the wings 23 of the keys 22. Complex supports, by several staged faces, are also possible. The faces mutually contacting the wings 21 and 23 will generally have the same direction in order to guarantee the whole surfaces are contacted.

The invention could be used in other situations, particularly in other turbo-machines. Instead of being located between the high pressure 6 and low pressure 7 turbines, the invention could also be positioned elsewhere, for example between the low pressure 3 and high pressure 4 compressors.

The invention claimed is:

1. An arrangement comprising a circular ferrule, substantially radial arms joining the ferrule to another concentric ferrule, and connections of the arms to the ferrule, the connections comprise wings protruding from two opposite sides of the arm, keys comprising protruding wings, drillings of the ferrule and drillings of the keys, and bolts passing through alignments, each comprising one of the drillings of the ferrule and one of the drillings of the keys, and retaining the keys against the ferrule, the wings protruding from the arm being respectively retained between the wings of the keys and the ferrule, wherein the arrangement comprises alignments of other drillings of the ferrule and drillings of the arm, these alignments being occupied by centring pins, the ferrule is cone-shaped and comprises bosses, said bosses being either flat or cylindrical, wherein the keys face the bosses, and the arms are surrounded with fairings.

2. The arrangement according to claim 1, wherein the key wings and the arm wings are in contact through faces all parallel to one another.

3. The arrangement according to claim 1, wherein the key wings and the arm wings are in contact through faces forming angles therebetween, the key and arm wings being tapered from the keys and the arm, respectively.

4. A turbo-machine comprising an arrangement according to claim 1, wherein the ferrule, the other ferrule and the arms are located between a high pressure turbine and a low pressure turbine, the arms passing through a stream of combustion gas.

5. The arrangement according to claim 1, wherein said bosses are flat.

6. The arrangement according to claim 1, wherein said bosses are cylindrical.

* * * * *